(12) United States Patent
Cai

(10) Patent No.: US 8,675,570 B2
(45) Date of Patent: Mar. 18, 2014

(54) SCALABLE OFDM AND OFDMA BANDWIDTH ALLOCATION IN COMMUNICATION SYSTEMS

(75) Inventor: Sean Cai, San Diego, CA (US)

(73) Assignee: ZTE (USA) Inc., Morristown, NJ (US)

( * ) Notice: Subject to any disclaimer, the term of this patent is extended or adjusted under 35 U.S.C. 154(b) by 1031 days.

(21) Appl. No.: 12/079,245

(22) Filed: Mar. 24, 2008

(65) Prior Publication Data
US 2008/0240275 A1 Oct. 2, 2008

Related U.S. Application Data

(60) Provisional application No. 60/896,859, filed on Mar. 23, 2007.

(51) Int. Cl.
*H04W 4/00* (2009.01)
(52) U.S. Cl.
USPC ............................ 370/329; 375/259; 375/260
(58) Field of Classification Search
None
See application file for complete search history.

(56) References Cited

U.S. PATENT DOCUMENTS

| | | | |
|---|---|---|---|
| 5,726,978 A | 3/1998 | Frodigh et al. | |
| 5,982,327 A * | 11/1999 | Vook et al. | 342/380 |
| 6,904,283 B2 | 6/2005 | Lie et al. | |
| 7,158,475 B1 | 1/2007 | Ikeda et al. | |
| 2004/0233838 A1* | 11/2004 | Sudo et al. | 370/208 |
| 2005/0085236 A1* | 4/2005 | Gerlach et al. | 455/450 |
| 2007/0036066 A1* | 2/2007 | Thomas et al. | 370/208 |
| 2007/0183520 A1* | 8/2007 | Kim et al. | 375/260 |
| 2007/0242600 A1* | 10/2007 | Li et al. | 370/210 |
| 2007/0258394 A1* | 11/2007 | Hamaguchi | 370/310 |
| 2008/0205351 A1* | 8/2008 | Lindoff et al. | 370/336 |

FOREIGN PATENT DOCUMENTS

| | | |
|---|---|---|
| EP | 0 869 647 | 10/1998 |
| EP | 1 006 668 A1 | 6/2000 |

OTHER PUBLICATIONS

Sun, Yi, "Bandwidth-efficient wireless OFDM," IEEE Journal on Selected Areas in Communications, vol. 19, No. 11, Nov. 2001, pp. 2267-2278.

International Search Report and Written Opinion, dated Aug. 25, 2008, from international application PCT/US2008/003900, entitled "Scalable OFDM and OFDMA Bandwidth Allocation in Communication Systems," (10 pages).

IEEE 802.16-2004, "IEEE Standard for Local and Metropolitan Area Networks, Part 16: Air Interface for Fixed Broadband Wireless Access Systems," Oct. 1, 2004, 895 pages.

IEEE 802.16e 2005, "IEEE Standard for Fixed and Mobile Broadband Wireless Access Systems, Part 16: Air Interface for Fixed and Mobile Broadband Wireless Access Systems and Amendment 2: Physical and Medium Access Control Layers for Combined Fixed and Mobile Operation in Licensed Bands and Corrigendum 1," Feb. 18, 2006, 864 pages.

3GPP2 UMB Standard, $3^{rd}$ Generation Partnership Project 2 "3GPP2": "Overview for Ultra Mobile Broadband (UMB) Air Interface Specification," Version 1.0, Apr. 2007, 42 pages.

(Continued)

*Primary Examiner* — Charles C Jiang
(74) *Attorney, Agent, or Firm* — Perkins Coie LLP

(57) ABSTRACT

Techniques for bandwidth allocation in communication systems such as OFDM, OFDMA, or SC-FDMA systems to improve spectral efficiency and increase flexibility and adaptability with scalable single or multiple-carrier bandwidth allocation characteristics.

16 Claims, 12 Drawing Sheets

Exemplary of Carrier Distance Between Adjacent Carriers Can Not Be Divided Evenly By Subcarrier Spacing

(56) References Cited

OTHER PUBLICATIONS

Hongyun, Qu, et al., "Further Consideration on IEEE 802.16m OFDMA numerology," IEEE802.16 Task Group, Official Documents, Mar. 19, 2008, IEEE C802.16m-08/236r3, URL: <http://ieee802.org/16/tgm/contrib/C80216m-08_236r3.pdf>, 22 pages.

LG Electronics, Uplink Multiple Access scheme, 3GPP TSG RAN WG1 Ad Hoc on LTE, Jun. 15, 2005, R1-050638 (8 pages).
Office Action dated Nov. 19, 2013 for Japanese Patent Application No. 2010-500960 (9 pages).

\* cited by examiner

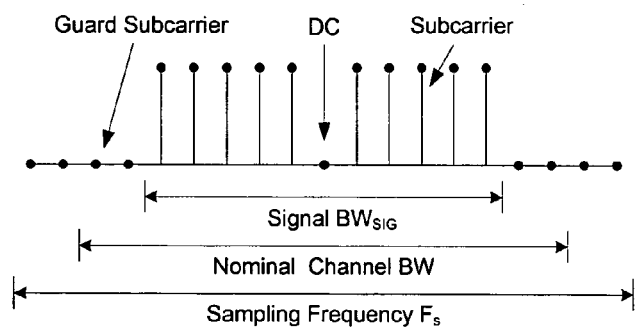
FIG. 1A. Exemplary OFDM/OFDMA Signal Frequency Domain Definition
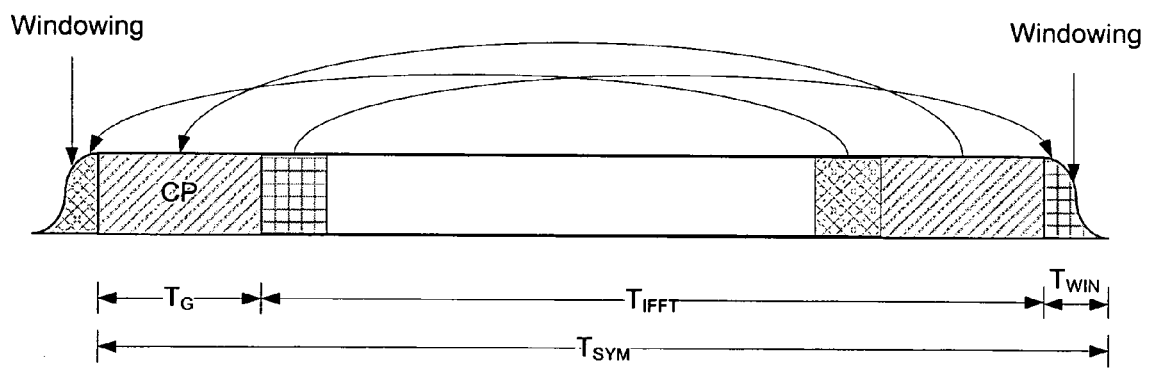
FIG. 1B. OFDM/OFDMA Symbol Time Domain Structure

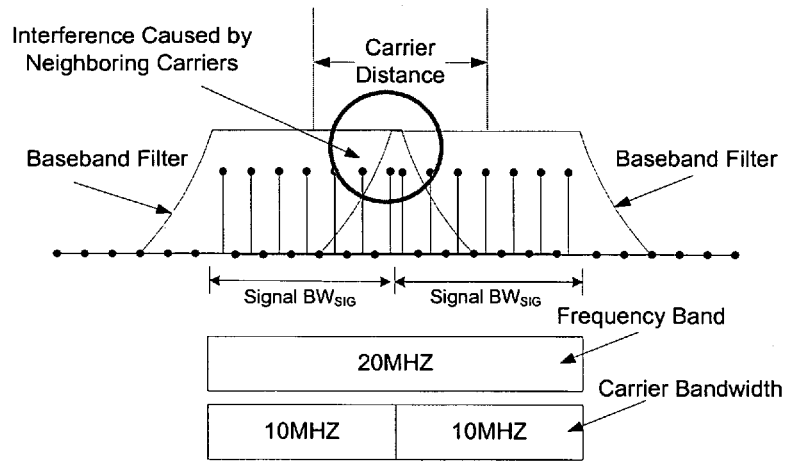
FIG. 2A. Exemplary of Carrier Distance Between Adjacent Carriers Can Not Be Divided Evenly By Subcarrier Spacing
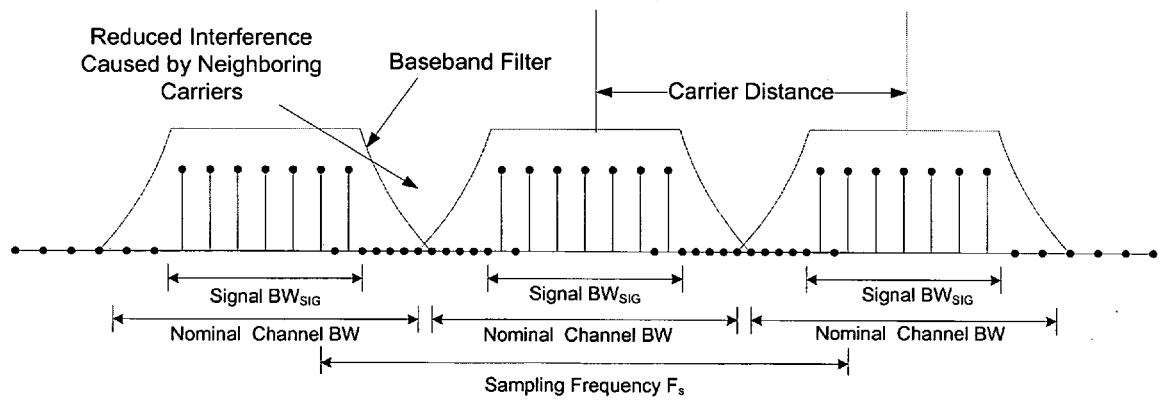
FIG. 2B. Exemplary Multi-carrier OFDM/OFDMA Bandwidth Allocation

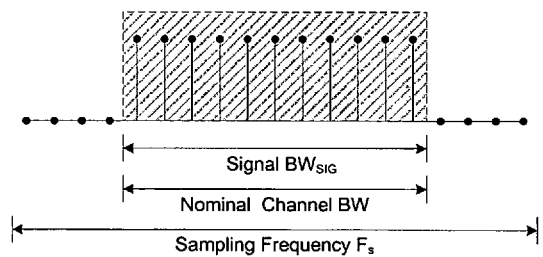
FIG. 3A. Exemplary Scalable OFDM/OFDMA Signal Frequency Domain Definition
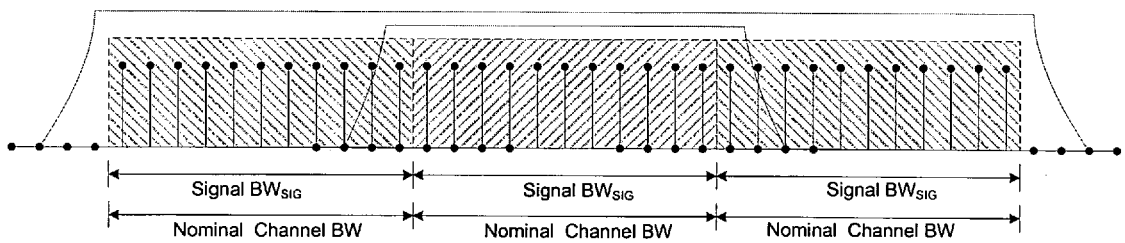
FIG. 3B. Exemplary Multi-carrier Scalable OFDM/OFDMA Bandwidth Allocation

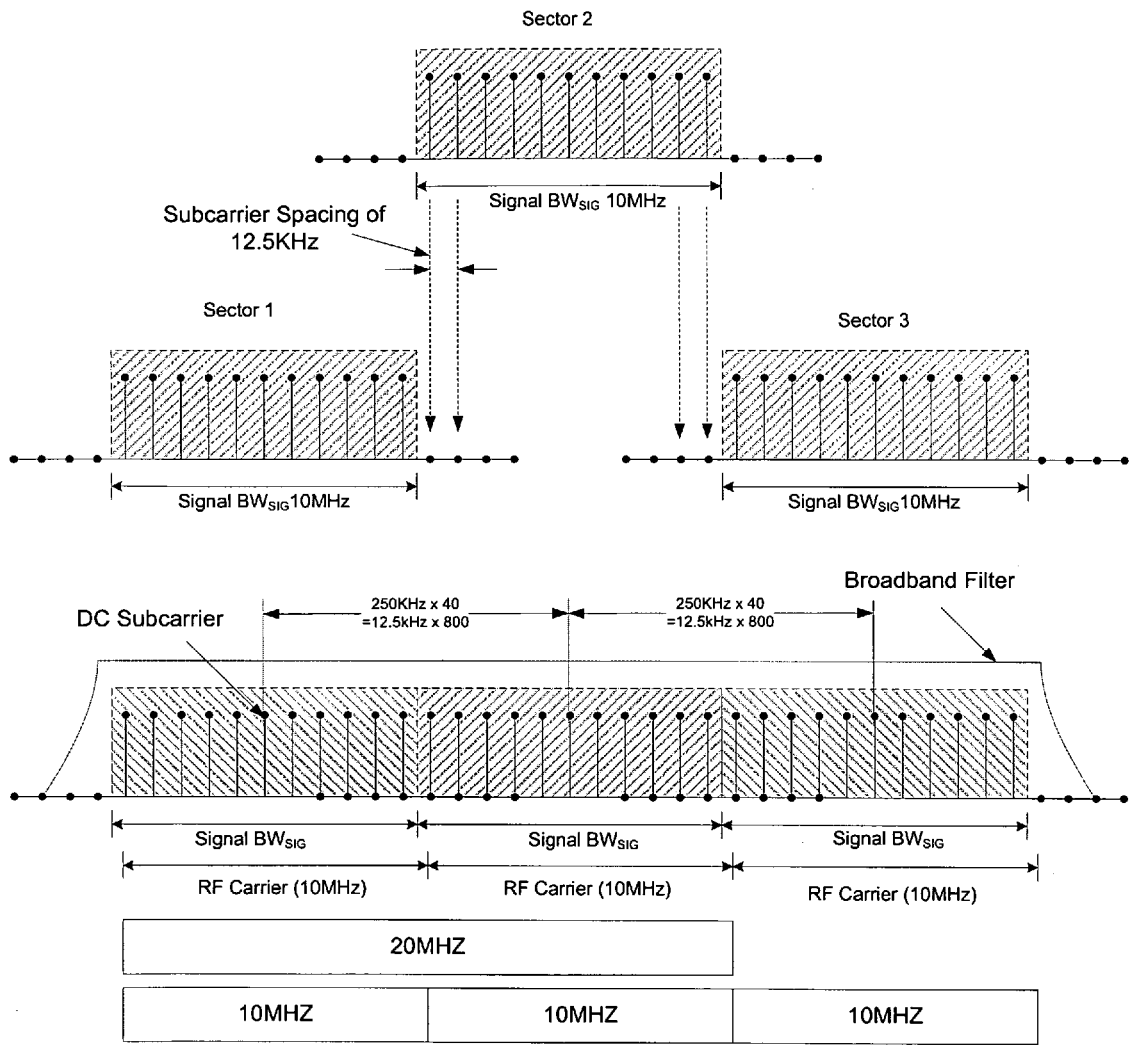
FIG. 3C. Exemplary Multi-carrier Scalable OFDM/OFDMA Bandwidth Allocation with Subcarrier Spacing of 12.5KHz and Carrier Bandwidths of 10MHz

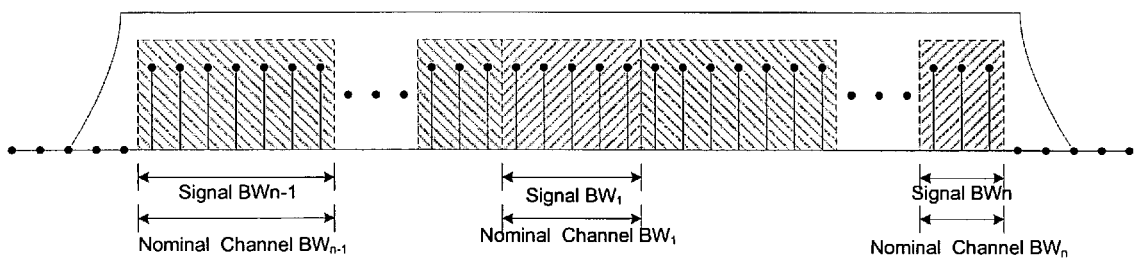
FIG. 4A. Exemplary Non-uniform Multi-carrier Scalable OFDM/OFDMA Bandwidth Allocation
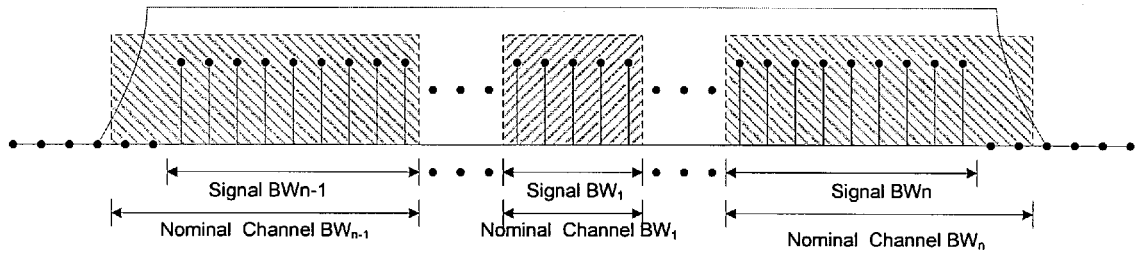
FIG. 4B. Exemplary Multi-carrier Scalable OFDM/OFDMA Bandwidth Allocation With Edge Guard Bands

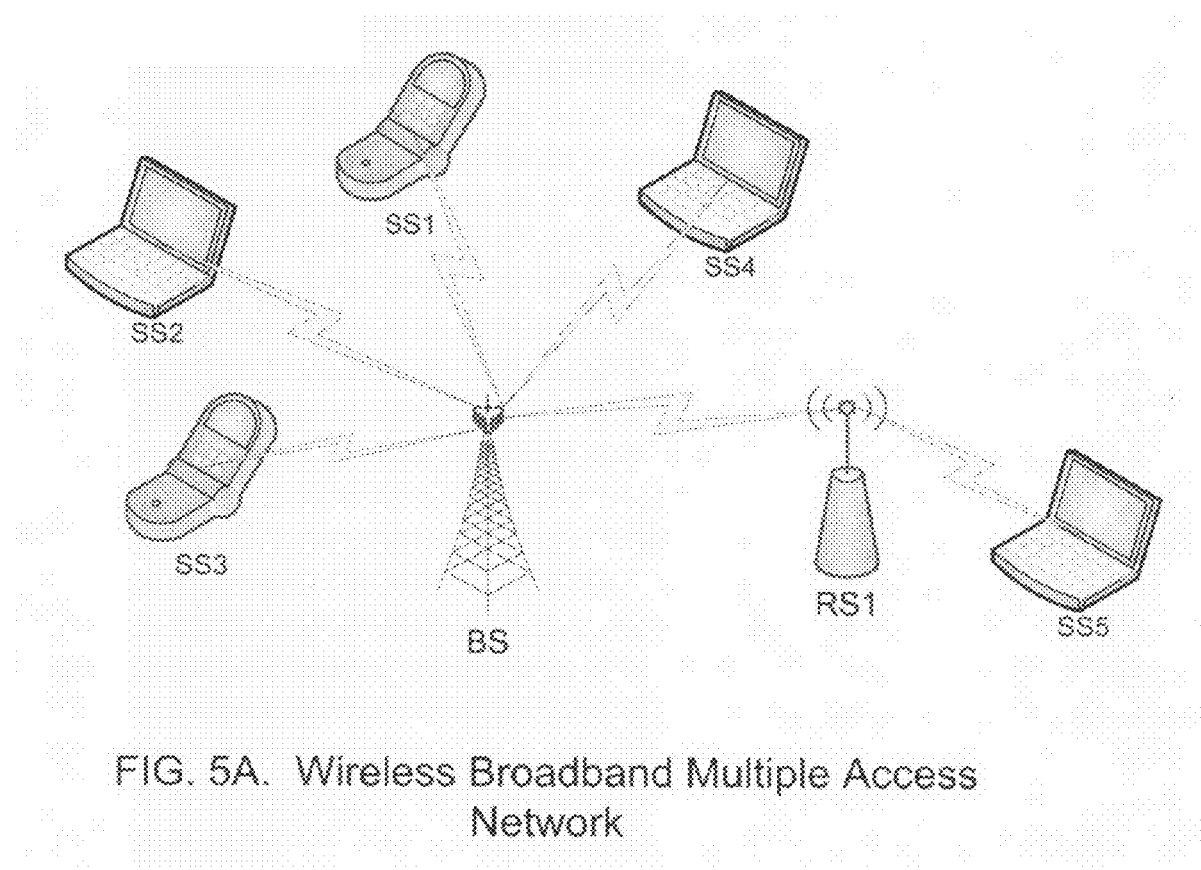
FIG. 5A. Wireless Broadband Multiple Access Network

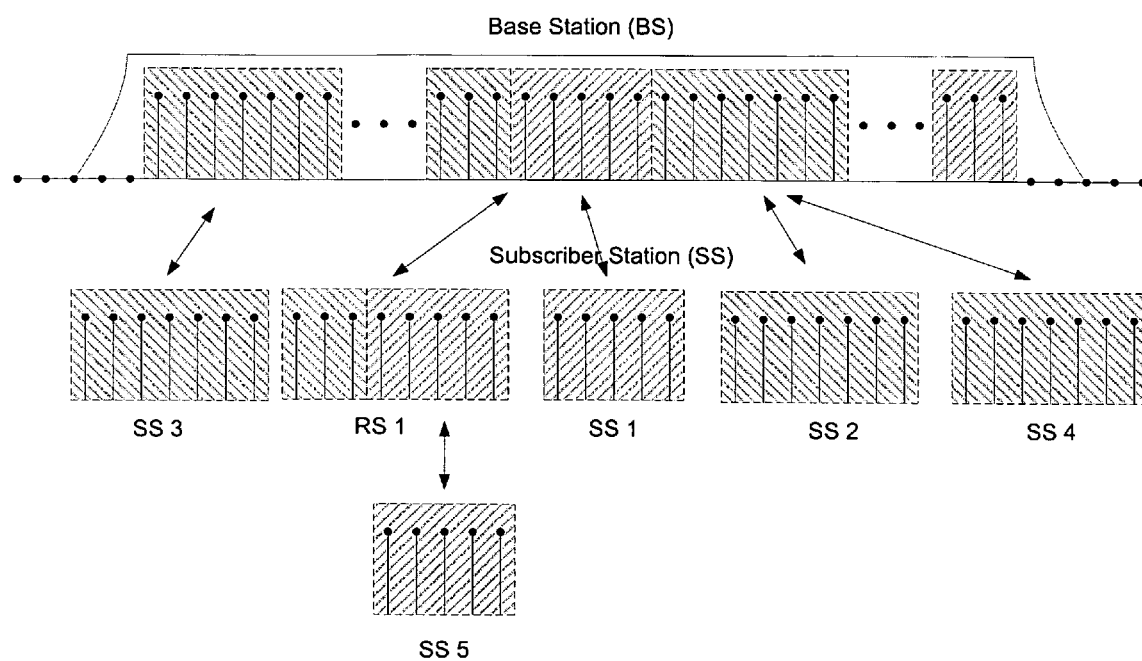
FIG. 5B. Exemplary Scalable Multicarrier OFDM/OFDMA Bandwidth Allocation with Relay Station

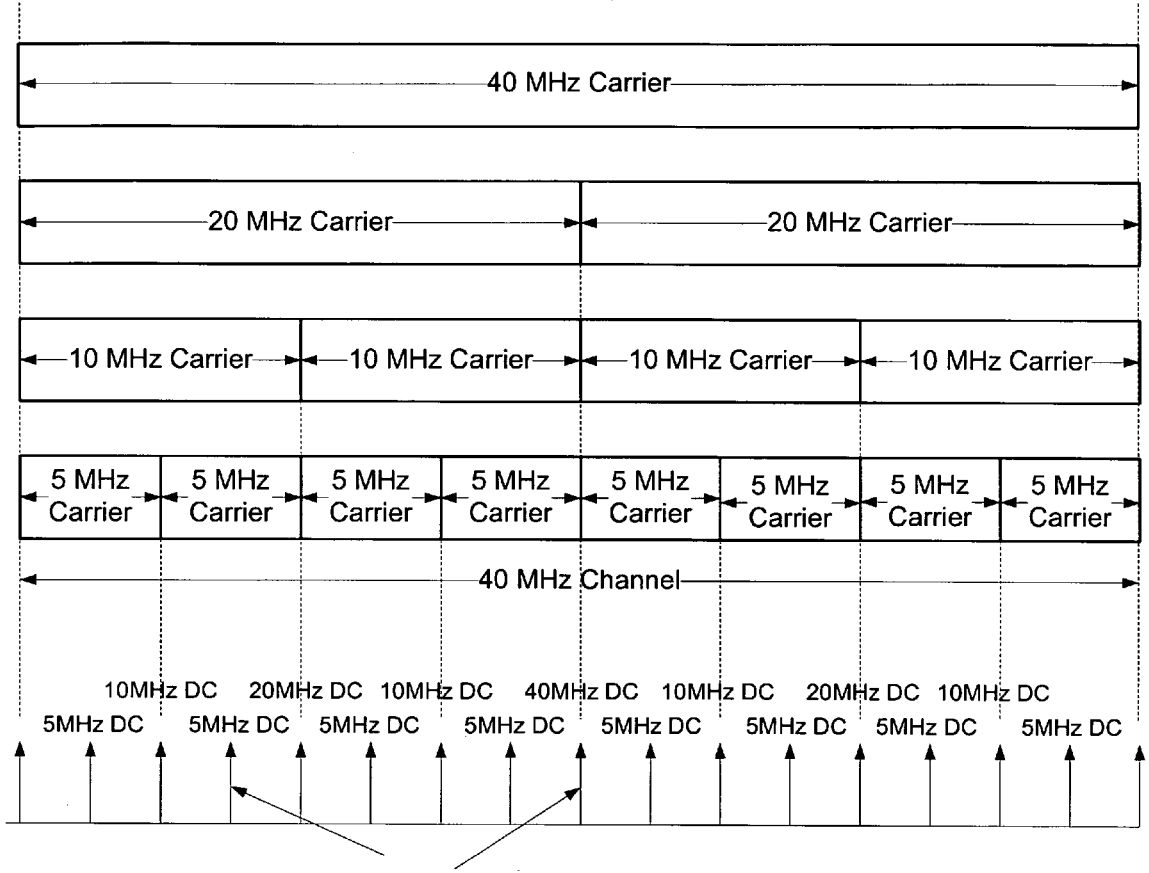
FIG 6A. Exemplary Scalable and Flexible Multi-Carrier OFDMA Deployment

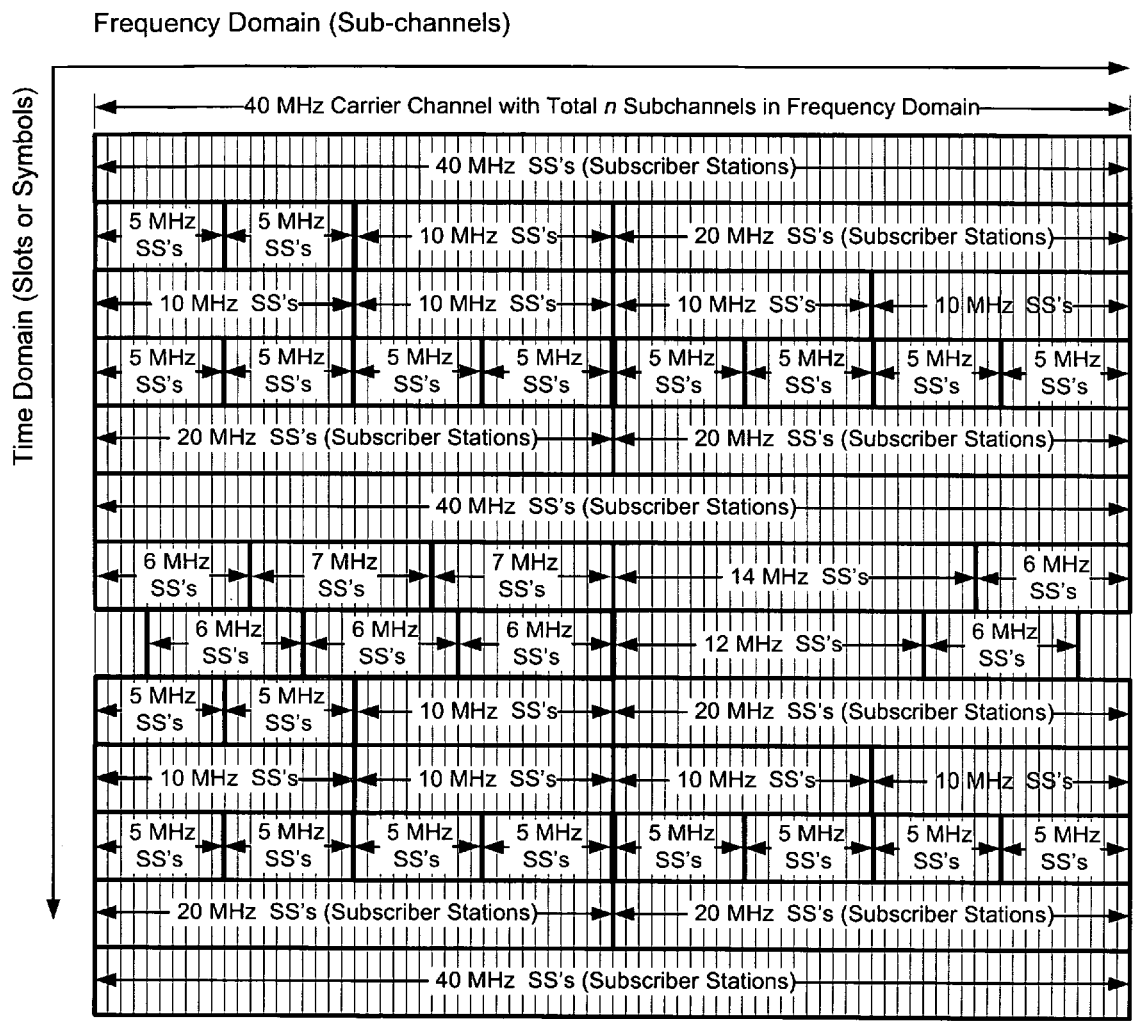
FIG 6B. Exemplary Flexible Multi-Carrier Mixed Bandwidths Deployment

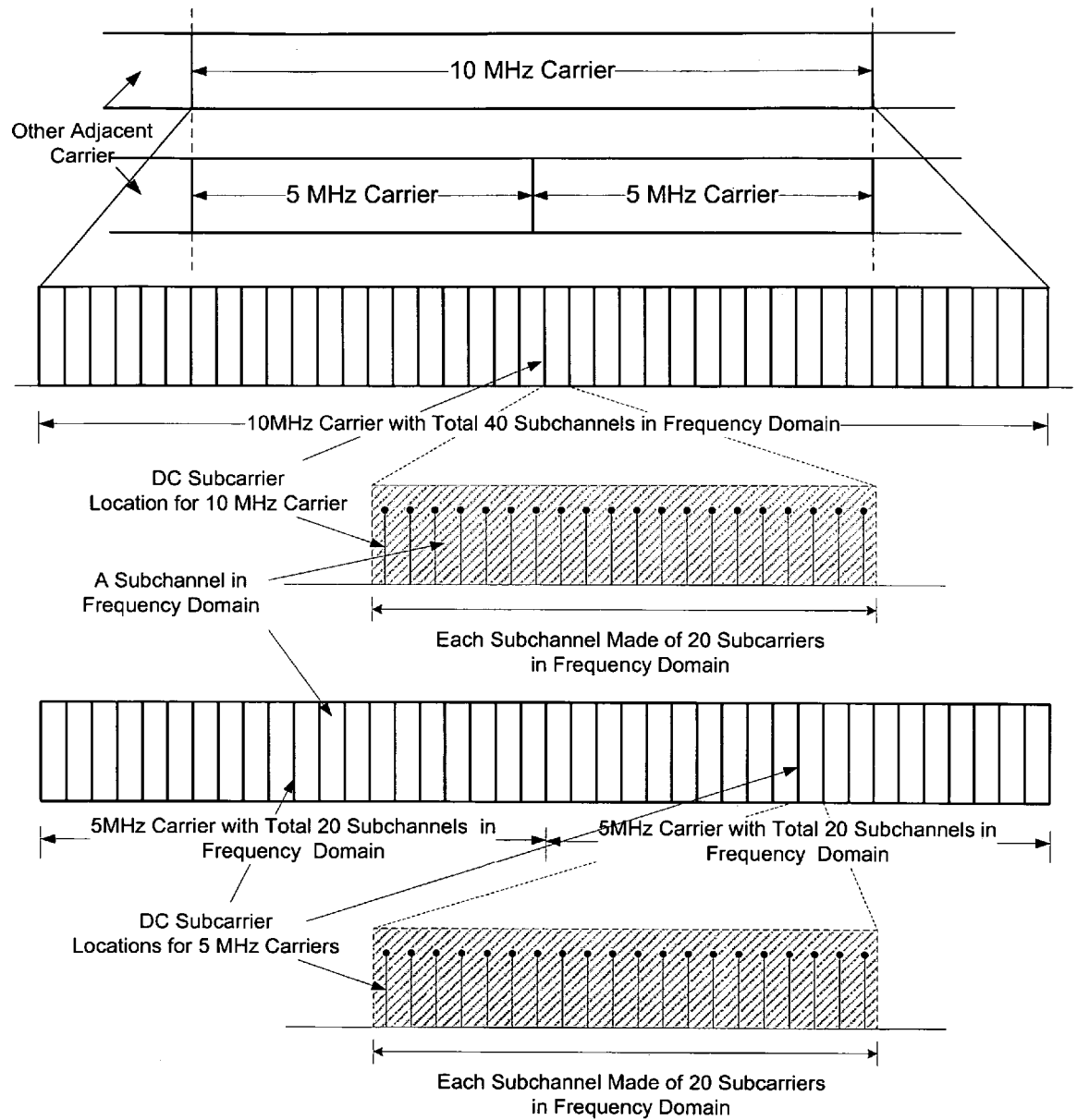
FIG 6C. Exemplary Scalable and Flexible Multi-Carrier OFDMA Deployment

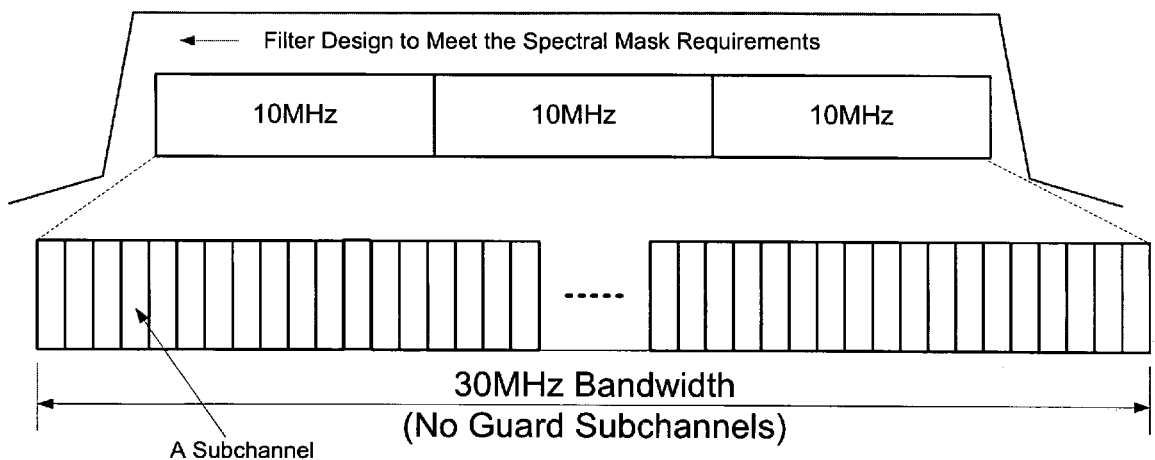
FIG 7A. Exemplary 10MHz Multi-Carrier OFDMA Deployment Without Guard Bands

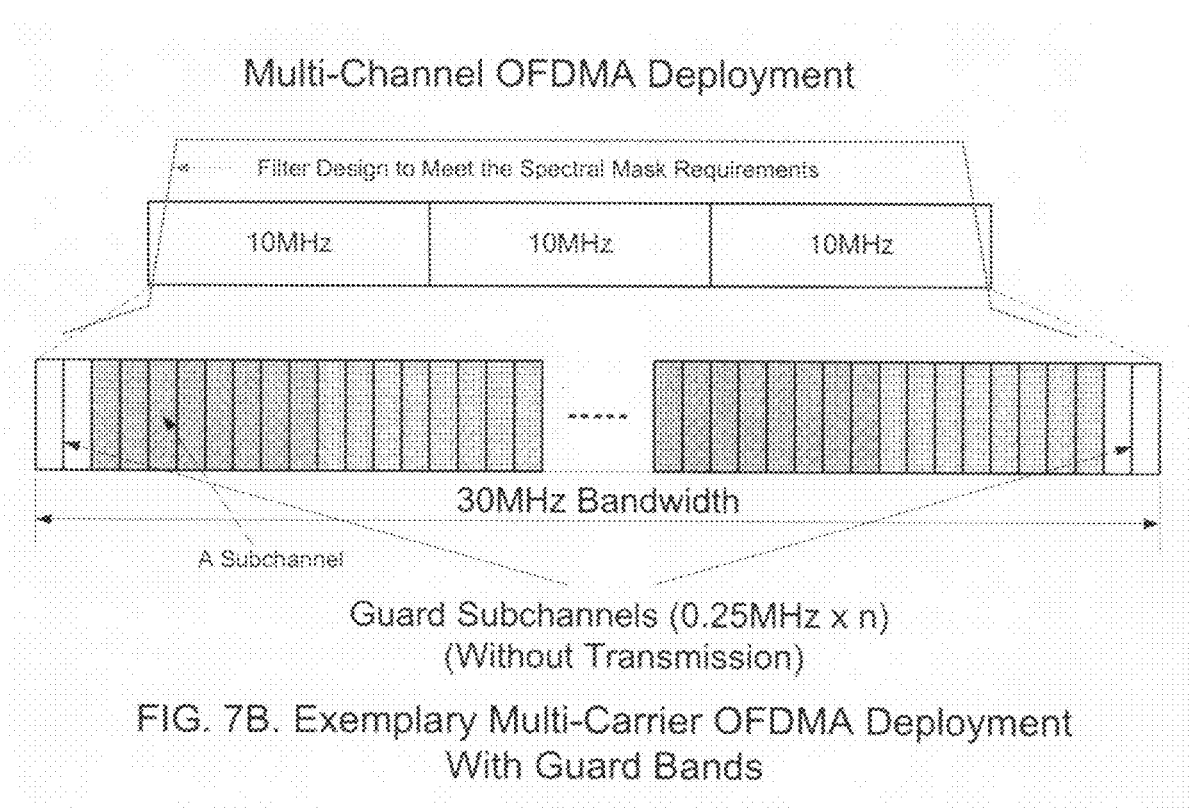
FIG. 7B. Exemplary Multi-Carrier OFDMA Deployment With Guard Bands

US 8,675,570 B2

SCALABLE OFDM AND OFDMA BANDWIDTH ALLOCATION IN COMMUNICATION SYSTEMS

PRIORITY CLAIM AND RELATED PATENT APPLICATION

This application claims the benefit of U.S. Provisional Application No. 60/896,859 entitled "SCALABLE OFDM AND OFDMA BANDWIDTH ALLOCATION IN COMMUNICATION SYSTEMS" and filed on Mar. 23, 2007, which is incorporated by reference as part of the specification of this application.

BACKGROUND

This applications relates to wired and wireless communications including communications based on, among others, OFDM (Orthogonal Frequency Division Multiplexing), OFDMA (Orthogonal Frequency Division Multiple Access), and SC-FDMA (Single Carrier Frequency-Division Multiple Access) systems.

In various wireless cellular networks, communication capacity and data throughput may be degraded due to unavailable or congested network spectrum. Allocated spectral bands are becoming increasingly congested with desired and undesired signals due to the proliferation of both intentional and unintentional electromagnetic emissions. Such a congested spectrum can lead to signal degradation and interferences. For example, both low and high power signals may be simultaneously observed by a receiver's antenna or antenna array. Under such conditions, desired signals may be obscured and undetectable since they can be buried beneath much stronger clusters of interfering signals.

Among the different technologies that can make use of the spectrum, Orthogonal Frequency Division Multiplexing (OFDM) is a technique for multicarrier data transmission that has been standardized for several wireless network physical layers. In OFDM, an allocated channel is divided into a number of orthogonal subchannels. Each subchannel has an equal bandwidth and is made of a unique group of subcarrier signals. The subcarrier signals are orthogonal in that the inner product of any two of the subcarriers equals zero. The frequencies of the orthogonal subcarrier signals are equally and minimally spaced so data modulation of the subcarrier signals facilitates optimal bandwidth efficiency. In comparison, frequency division multiplexing for multicarrier data transmission utilizes non-orthogonal subcarrier signals and uses segments of allocated channel bandwidth to isolate subcarrier signal frequency spectra.

Orthogonal Frequency Division Multiple Access (OFDMA) is a multi-user version of OFDM technology. The multiple access is achieved in OFDMA by assigning subsets of orthogonal subcarriers to individual subscriber stations. OFDMA may be viewed as a combination of frequency domain and time domain multiple access where radio resources are partitioned in a time-frequency space, and network user data bursts are assigned along the OFDM symbol index as well as OFDM sub-carrier index. OFDMA has been widely adopted by various standard bodies.

The Single Carrier Frequency Division Multiple Access (SC-FDMA) can be viewed as either a linearly precoded OFDMA scheme, or a single carrier multiple access scheme. One advantage of SC-FDMA over a conventional OFDMA is that the SC-FDMA signal has lower peak-to-average power ratio (PAPR) because of its inherent single carrier modulation method. The SC-FDMA can also be considered as an alternative to OFDMA, especially for the uplink communications where lower PAPR benefits the mobile terminal power efficiency. SC-FDMA has been adopted for uplink multiple access scheme in 3GPP Long Term Evolution (LTE), or Evolved UTRA.

In the frequency domain, an OFDM or OFDMA signal is made up of orthogonal subcarriers, the number of which determines the size of the Fast Fourier Transform (FFT), $N_{FFT}$. FIG. 1A illustrates the OFDMA bandwidth definition. Assuming $\Delta f$ is the subcarrier spacing, the sampling frequency $f_S$ can be calculated with the formula:

$$f_S = \Delta f \times N_{FFT}$$

For a given nominal channel bandwidth BW, only a subset of subcarriers $N_{SIG}$ out of $N_{FFT}$ is occupied for signals, referred as signal bandwidth $BW_{SIG}$. $N_{SIG}$ may include DC sub-carrier which often contains no data. The rest of the subcarriers which are not used for transmission of data and information serve as guard subcarriers. The guard subcarriers are used to enable the signal to naturally decay and create the FFT "brick wall" shaping. The rule of thumb to select the FFT size is to choose the smallest power of two that is greater than $N_{SIG}$. As illustrated, the normal channel bandwidth BW is greater than the signal bandwidth due to the presence of the guard subcarriers on both sides of the signal-carrying subcarriers. The sampling frequency fs is selected to be greater than the normal channel bandwidth.

In the OFDMA physical layer, the resource grid and basic resource block are defined. Based on the defined resource grid, one or multiple basic blocks in a group in the frequency domain are defined as a subchannel in some standards. $N_{SIG}$ may contain multiple subchannels or basic resource blocks, each consists of $N_{SC}$ subcarriers. The subchannel is used as the minimum channel bandwidth division unit in this document and each subchannel has $N_{SC}$ subcarriers.

The Inverse Fast Fourier Transform (IFFT) creates an OFDM or OFDMA waveform and the associated time duration is referred to as the useful symbol time $T_{IFFT}$. FIG. 1B illustrates the time domain symbol structure of an OFDM or OFDMA signal. A copy of the last of the useful symbol period is known as the Cyclic Prefix (CP) $T_G$ and is used to collect multipath, while maintaining the orthogonality of the tones. In addition, a small windowing period can be optionally added to a time slot before the CP and a time slot at the end of a symbol time. Adding windowing periods can reduce the signal in-band emission and the signal out-of-band emission. The total symbol time $T_{SYM}$ includes the additional CP time $T_G$, and optional windowing time $T_{WIN}$, $T_{SYM} = T_G + T_{IFFT} + T_{WIN}$. Using a cyclic extension, the samples required for performing the FFT at the receiver can be taken anywhere over the length of the extended symbol. This provides the multipath immunity as well as a tolerance for symbol time synchronization errors.

SUMMARY

This application describes, among others, OFDM (Orthogonal Frequency Division Multiplexing), OFDMA (Orthogonal Frequency Division Multiple Access), and SC-FDMA (Single Carrier Frequency-Division Multiple Access) bandwidth allocation techniques to reduce and, in some cases, eliminate guard subcarriers. In various implementations, the described techniques can be used to enhance the spectral efficiency of the usage of spectrum.

In one aspect, a method for allocating spectral bandwidth for an Orthogonal Frequency Division Multiplexing (OFDM) or Orthogonal Frequency Division Multiple Access (OFDMA) system is described to include: choosing a common subcarrier spacing for orthogonal subcarriers; selecting a sampling frequency that is equal to or greater than a given nominal channel bandwidth of a carrier; and using subcarriers within the given nominal channel bandwidth for signal transmission without assigning subcarriers as guard subcarriers at both ends of the given nominal channel bandwidth of the carrier.

In another aspect, a method for spectral bandwidth allocation for an Orthogonal Frequency Division Multiplexing (OFDM) and Orthogonal Frequency Division Multiple Access (OFDMA) system is described to include allocating multiple different nominal channels to be sequentially next to one another in frequency without guard bands in between; assigning all subcarriers in the multiple different nominal channels to have a common subcarrier spacing between two adjacent subcarriers and to be aligned across the multiple different nominal channels; selecting a sampling frequency that is equal to or greater than a given nominal channel bandwidth or multiple nominal channel bandwidths; and using subcarriers within a given nominal channel bandwidth or multiple channel bandwidths for signal transmission without assigning subcarriers as guard subcarriers at both ends of the nominal channel bandwidth for each of the multiple different nominal channels.

In another aspect, a method for allocating spectral bandwidth for an Orthogonal Frequency Division Multiplexing (OFDM), Orthogonal Frequency Division Multiple Access (OFDMA) system, or Single Carrier Frequency-Division Multiple Access (SC-FDMA) includes dividing a frequency band into a plurality of channels with normal channel bandwidths; dividing each channel into a plurality of subchannels each comprising a plurality of subcarriers; and selecting the nominal channel bandwidths so that each nominal channel bandwidth is evenly divided into a plurality of subchannels.

In yet another aspect, a method for allocating spectral bandwidth for an Orthogonal Frequency Division Multiplexing (OFDM), Orthogonal Frequency Division Multiple Access (OFDMA), or Single Carrier Frequency-Division Multiple Access (SC-FDMA) system includes choosing a carrier distance between two neighboring carriers in deployment so that edge subcarriers belonging to two different carriers are orthogonal to each other to reduce or eliminate inter-carrier interference.

In yet another aspect, a method for allocating spectral bandwidth for an Orthogonal Frequency Division Multiplexing (OFDM), Orthogonal Frequency Division Multiple Access (OFDMA), or Single Carrier Frequency-Division Multiple Access (SC-FDMA) system includes choosing a common subcarrier spacing of orthogonal subcarriers to evenly divide a given nominal carrier bandwidth.

In yet another aspect, a method for allocating spectral bandwidth for an Orthogonal Frequency Division Multiplexing (OFDM), Orthogonal Frequency Division Multiple Access (OFDMA), or Single Carrier Frequency-Division Multiple Access (SC-FDMA) system includes choosing a common subcarrier spacing of orthogonal subcarriers that can divide multiple nominal channel bandwidths evenly in a multi-carrier system.

These and other examples and implementations are described in greater detail in the attached drawings, the detailed description and the claims.

BRIEF DESCRIPTION OF THE DRAWINGS

FIGS. 1A, and 1B show an exemplary OFDM or OFDMA signal definition in frequency domain and time domain respectively.

FIG. 2A illustrates, even for the typical same OFDM technology deployment, the carrier distance between the two neighboring OFDM systems can not be divided evenly by the subcarrier spacing, subcarrier spacing can not be maintained across the boundary of the two carriers, which will cause strong inter-carrier interference to each other at the edge subcarriers.

FIG. 2B illustrates the guard subcarriers (without signal transmission) and filtering are used to reduce the inter-carrier interference described in FIG. 2A.

FIG. 3A shows an exemplary OFDM or OFDMA signal where the nominal carrier bandwidth is divided evenly by the subcarrier spacing. No guard subcarriers are needed in some applications or deployment.

FIG. 3B shows an exemplary multi-carrier OFDM or OFDMA deployment, where no guard subcarriers are necessary among the three carriers and all subcarriers are orthogonal to each other.

FIG. 3C shows an example of how a multi-carrier signal is generated. In the example a three carriers of 10 MHz are used and the number of subcarriers is not accurate, and is solely for illustration purpose. Applying the methods of this invention, the three 10 MHz carriers can be deployed side-by-side without guard bands in between.

FIG. 4A illustrates variation of examples of multi-carrier scalable OFDM or OFDMA bandwidth allocation.

FIG. 4B illustrates possible option not to transmit at the edge subcarriers in order to meet the spectral mask requirements in some deployment.

FIG. 5A illustrate an example of scalable multi-carrier OFDM or OFDMA network which includes a base station, a relay station, and 5 subscriber stations.

FIG. 5B showcases a multiple-carrier scalable OFDM and OFDMA hybrid bandwidth allocation scheme, where the relay station (RS) also supports mixed multi-carrier deployment. The carrier channel bandwidth in deployment can be divided into multiple of different smaller carrier channel bandwidths. Each channel bandwidth is capable of support its class of subscriber stations independently, including initial synchronization process.

FIG. 6A illustrate an example of scalable multi-carrier OFDM, OFDMA, or SC-FDMA network, in which a 40 MHz carrier channel bandwidth can be divided into multiple of 20 MHz, 10 Mhz, and 5 MHz carrier channel bandwidths.

FIG. 6B illustrates a dynamic multi-carrier deployment where different multi-carrier channel bandwidths are supported dynamically in time.

FIG. 6C illustrates an example of how a 10 MHz carrier bandwidth can be split into two 5 MHz carrier channel in the deployment.

FIGS. 7A and 7B illustrate an multi-carrier deployment example of 3×10 MHz channel bandwidth.

DETAILED DESCRIPTION

Various communication systems define an OFDM, OFDMA or SC-FDMA symbol structure to include guard subcarriers to enable the signal to naturally decay and create the FFT "brick Wall" shaping in order to reduce undesired interferences between neighboring channels. Examples include communication systems based on IEEE 802.16 or WiMAX, Ultra Mobile Broadband (UMB), and Long Term Evolution (LTE) systems.

The symbol structures in various OFDM or OFDMA systems with guard subcarriers can lead to variations in the subcarrier spacing. Therefore, the orthogonality of two adjacent subcarriers is no longer preserved and this condition causes intersymbole interference between adjacent symbols.

FIG. 2A shows an example where, in the same OFDM technology deployment, the carrier distance between the two neighboring OFDM systems cannot be divided evenly by the subcarrier spacing and the subcarrier spacing can not be maintained at a constant across the boundary of the two carriers. This variation in the subcarrier spacing causes strong inter-carrier interference to each other at the edge subcarriers.

FIG. 2B illustrates an example of typical multi-carrier OFDM or OFDMA bandwidth allocation with the guard subcarriers. The guard subcarriers occupy frequency bands without transmitting useful signals and information. Signal filtering by baseband filters is used to reduce the inter-carrier interference. Such guard bands are also commonly used by other technologies. Although useful for reducing undesired signal interference, the presence of such guard bands reduces the available subcarriers for transmitting data and information within the normal signal bandwidth and thus reduces the utilization of the precious spectral real estate in allocated frequency bands.

This application includes, among others, examples and implementations of methods and apparatus for allocating signal bandwidth and subcarrier frequencies with a constant subcarrier frequency spacing to reduce or eliminate unnecessary guard bands in the spectral bandwidth allocation in wireless communication systems, such as OFDM and OFDMA systems. The guard bands between different carriers can be eliminated and to increase the spectral efficiency of overall spectrum. In most of the OFDM and OFDMA standard technologies developed, the subcarrier spacing can not divide a nominal RF carrier bandwidth evenly, which results in an irregular number of available subcarriers for resource planning. By selecting a minimum size of resource block, the edge subcarriers become un-useable for data transmission, and they are often called guard subcarriers. The frequency efficiency is often reduced due to the presence of un-necessary guard subcarrier.

The numerology based on a typical legacy 16e design can be found in IEEE 802.15e 2005. The subcarrier spacing for 10 MHz nominal carrier bandwidth is defined to 10.9375 kHz. Out of 914 subcarriers that fall into the 10 MHz bandwidth, there are only 840 subcarriers that can be used to transmit information; the rest edge subcarriers become guard subcarriers which are not used for transmit signals; about 8.8% of the bandwidth is wasted. If the guard subcarriers can be utilized for data transmission, the frequency efficiency can be 8.8% more efficient.

The maximum frequency efficiency can be computed by the following equation:

$$n_{Efficiency} = \frac{R_{Modulation} \times n_{UsedSubcarriers}}{T_{symobol} \times BW_{System}} \quad \text{(Eq. 1)}$$

where $R_{Modulation}$ is modulation rate (e.g. 4 for 16QAM), $n_{UsedSubcarriers}$ is number of used subcarriers within the nominal system bandwidth, $T_{symbol}$ is symbol period, and $BW_{System}$ is the nominal system bandwidth. Let's set CP=0 to calculate the maximum $n_{Efficiency}$ of the system $$T_{symobol} = \frac{1}{\Delta f} \quad \text{(Eq. 2)}$$

where $\Delta f$ is subcarrier spacing.

$$BW_{system} \geq n_{MaximumSubcarriers} \times \Delta f \quad \text{(Eq. 3)}$$

where $n_{MaximumSubcarriers}$ is the maximum number of subcarriers that a nominal system bandwidth can have.

Substitution of Eq. 2, and Eq. 3 into Eq. 1 yields the following:

$$n_{Efficiency} \leq \frac{R_{Modulation} \times n_{UsedSubcarriers}}{n_{MaximumSubcarriers}} \quad \text{(Eq. 4)}$$

Therefore, the frequency efficiency is proportional to the number of used subcarriers over the maximum number of subcarriers within the carrier nominal bandwidth.

Under the UMB (Ultra Mobile Broadband) of 3GPP2 (3$^{rd}$ Generation Partnership Project 2) standard, the subcarrier spacing is 9.6 kHz and cannot be divided evenly by nominal carrier bandwidths such as 1.25 MHz, 2.5 MHz, 5 MHz, 10 MHz, or 20 MHz. As a result, some of the edge subcarriers are left as guard subcarriers with no signal transmission. This condition results in a lower spectrum usage or spectral efficiency. Under the LTE (Long Term Evolution) of 3GPP2 (3$^{rd}$ Generation Partnership Project) standard, the subcarrier spacing is 15 kHz or 7.5 KHz and cannot be divided evenly by nominal carrier bandwidths such as 1.25 MHz, 2.5 MHz, 5 MHz, 10 MHz, or 20 MHz. Some of the edge subcarriers are left as guard subcarriers with no signal transmission. Similar to the UMB, this condition in LTE leads to a lower spectrum usage or spectral efficiency.

One method to reduce or eliminate guard bands is to choose a common subcarrier spacing ($\Delta f$) of orthogonal subcarriers that can evenly divide a carrier distance of two neighboring carriers. This technique can reduce the interference caused by the two neighboring carriers when the carrier distance cannot be divided evenly by the subcarrier spacing as shown in FIG. 2A.

One implementation of the above method is to choose a common subcarrier spacing ($\Delta f$) of orthogonal subcarriers that can evenly divide a given nominal channel bandwidth. Subcarrier spacings ($\Delta f$) of 12.5 KHz and 10 KHz are given in Table 1 and Table 2 respectively as implementation examples of OFDMA systems. In Table 1, subcarrier spacing ($\Delta f$) of 12.5 KHz can divide all nominal carrier bandwidths. The number of used subcarriers for each carrier bandwidth can be calculated and shown in Table 1. Similarly subcarrier spacing ($\Delta f$) of 10 KHz can evenly divide all nominal carrier bandwidths. The number of used subcarriers for each carrier bandwidth can be calculated and shown in Table 2.

Table 1 illustrates the exemplar subcarrier spacing of 12.5 KHz and a subchannel of 20 subcarriers. Alternatively, a subchannel of 16 subcarriers can also be used for system deployment.

| Parameter | Unit | Parameter Values | | | | | | | | |
|---|---|---|---|---|---|---|---|---|---|---|
| Channel Bandwidth (BW) | MHz | 5 | 6 | 7 | 8.75 | 10 | 12 | 14 | 20 | 40 |
| Sub-carrier Spacing ($\Delta f$) | KHz | | | | | 12.5 | | | | |
| Sampling Frequency (Fs) | Mhz | 6.4 | 6.4 | 12.8 | 12.8 | 12.8 | 12.8 | 25.6 | 25.6 | 51.2 |
| FFT size | | 512 | 512 | 1024 | 1024 | 1024 | 1024 | 2048 | 2048 | 4096 |
| Number of Used sub-carriers (Nused) | | 400 | 480 | 560 | 700 | 800 | 960 | 1120 | 1600 | 3200 |
| Num of Sub-carriers Per Sub-channel | | | | | | 20 | | | | |
| Sub-channel Bandwidth | KHz | | | | | 250 | | | | |
| Number of Sub-channels | | 20 | 24 | 28 | 35 | 40 | 48 | 56 | 80 | 160 |
| Num of Guard Sub-channels (L or R) | | | | | | 0, or up to 4 | | | | |

Table 2 illustrates the exemplar subcarrier spacing of 10 KHz and subchannel of 20 subcarriers.

| Parameter | Unit | Parameter Values | | | | | | | |
|---|---|---|---|---|---|---|---|---|---|
| Channel Bandwidth (BW) | MHz | 5 | 6 | 7 | 10 | 12 | 14 | 20 | 40 |
| Sub-carrier Spacing ($\Delta f$) | KHz | | | | 10 | | | | |
| Sampling Frequency (Fs) | Mhz | 5.12 | 10.24 | 10.24 | 10.24 | 20.48 | 20.48 | 20.48 | 40.96 |
| FFT size | | 512 | 1024 | 1024 | 1024 | 2048 | 2048 | 2048 | 4096 |
| Number of Used sub-carriers (Nused) | | 500 | 480 | 700 | 1000 | 960 | 1400 | 2000 | 4000 |
| Num of Sub-carriers Per Sub-channel | | | | | 20 | | | | |
| Sub-channel Bandwidth | KHz | | | | 200 | | | | |
| Number of Sub-channels | | 25 | 30 | 35 | 50 | 60 | 70 | 100 | 200 |
| Num of Guard Sub-channels (L or R) | | | | | 0, or up to 5 | | | | |

In a typical OFDM or OFDMA deployment, the neighboring radio frequency (RF) carriers are also used for the same or similar OFDMA technologies. Therefore, multiple RF carriers can be placed so that the interference between neighboring RF carriers can be reduced to the minimum. In one implementation, a subcarrier spacing can evenly divide all nominal carrier bandwidths, exemplary subcarrier spacings, such as 12.5 KHz and 10 KHz, are shown in Table 1 and Table 2. In another OFDM, OFDMA, or SC-FDMA implementation, no guard subcarriers are needed within a given nominal channel bandwidth. The out of band emission is orthogonal to neighboring OFDM or OFDMA subcarriers or simply removed by digital and/or RF filters.

FIG. 3A illustrates that the signal bandwidth can be equal to the nominal channel bandwidth in one implementation. The spectral efficiency can be improved without wasting spectrum bandwidth on unnecessary guard subcarriers.

In another OFDM, OFDMA, or SC-FDMA implementation, multiple OFDM or OFDMA channels can be placed one next to each other provided the subcarrier spacing of all channels is uniformed, and all subcarriers are aligned among channels. The spectral efficiency can be improved without wasting spectrum bandwidth on unnecessary guard subcarriers between two neighboring channels.

FIG. 3B illustrates an exemplary multi-carrier OFDM or OFDMA bandwidth allocation. In the figure, subcarrier spacing remains the same and frequency aligned across the bandwidth boundaries of two neighboring carriers indicated by nominal bandwidths allocation. Since all the subcarriers are orthogonal to each other, the interference to neighboring RF carriers is reduced to minimum.

In another implementation, a subcarrier spacing can not only evenly divide all nominal carrier bandwidths, it can also divide a channel raster, such as 250 KHz, of a particular RF frequency band. The common subcarrier spacing of orthogonal subcarriers can be frequency aligned between boundaries of all adjacent carrier bandwidth allocations in the said RF frequency band to reduce or eliminate inter-carrier interference. The example of such implementation is illustrated in FIG. 3C. This implementation is particular important when the OFDM, OFDMA, or SC-FDMA system is designed to support multi-carrier.

In one implementation, a subcarrier spacing evenly divides all nominal carrier bandwidths and also divides multiple channel rasters, such as 250 KHz and 200 KHz, of different RF frequency bands. The common subcarrier spacing of orthogonal subcarriers can be frequency aligned between boundaries of all adjacent carrier bandwidth allocations in each of multiple RF frequency bands to reduce or eliminate inter-carrier interference within the said RF frequency band. This implementation is particular important when the OFDM, OFDMA, or SC-FDMA system is designed to support multi-carrier and global roaming.

In another implementation, the multi-carrier system bandwidth can be made of different-size nominal bandwidths. FIG. 4A illustrates an exemplary application of multiple carriers with non-uniformed bandwidths. As long as the base stations are frequency synchronized, the subcarriers remain orthogonal to each other. No guard subcarriers are necessary.

FIG. 4B illustrates an exemplary application of multi-carrier with edge guard carrier so that they will co-exist with other technologies.

In another OFDM or OFDMA implementation, the downlink and uplink bandwidths can be different. The downlink from a base station can be a multi-carrier system, and the uplink from a relay station (RS) subscriber station (SS) (a fixed, nomadic, or mobile station) can be working on only one or some of the nominal channel bandwidths. FIG. 5A shows an exemplary multiple access network. FIG. 5B illustrates the hybrid bandwidth allocation scenario among the base station and subscriber stations. In the illustration, the base station can simultaneously support multiple subscriber stations with different access carrier bandwidth. In the same illustration, the relay station can also simultaneously support multiple subscriber stations with different access carrier bandwidths.

This feature can be applicable to both FDD and TDD modes. This is different from the traditional hybrid deployment in FDD mode, where a downlink channel has a different (usually larger) bandwidth than a paired uplink channel. Both the base station and subscriber station have to utilize the downlink and uplink bandwidths, and it is usually not applied in the TDD mode.

In one implementation, communication systems described in this application can operate using Orthogonal Frequency Division Multiplexing (OFDM), Orthogonal Frequency Division Multiple Access (OFDMA), Frequency Division Duplexing (FDD), and Time Division Duplexing (TDD). These technologies described within this subsection are applicable to both wireline and wireless implementations.

Multiple OFDM or OFDMA channels can be transmitted from the same or different base stations. As long as the base stations are frequency synchronized, the subcarriers remain orthogonal to each other. No guard subcarriers are needed. This application is applicable to both FDD and TDD modes. This application is applicable to a relay station.

In another OFDM or OFDMA implementation, multiple OFDM, OFDMA, SC-FDMA carriers can be transmitted from the same or different base stations.

FIG. 6A illustrate an example of scalable multi-carrier OFDM, OFDMA, or SC-FDMA network, in which a 40 MHz carrier channel bandwidth can be divided into multiple of 20 MHz, 10 Mhz, and 5 MHz carrier channel bandwidths. When a subcarrier spacing is properly chosen, say 12.5 KHz or 10 KHz, each smaller carrier channel bandwidth is frequency aligned with the frequency band RF channel raster locations, so that the subscriber stations can potentially associate with the smaller carriers, say 5 MHz, 10 Mhz, or 20 MHz channels, independently without decoding the full 40 MHz bandwidth.

FIG. 6B illustrates a dynamic multi-carrier deployment where different multi-carrier channel bandwidths are supported dynamically in time. In the example, 5 MHz, 6 MHz, 7 MHz, 10 MHz, 12 Mhz, 14 MHz, 20 MHz can be supported simultaneously by the multi-carrier system in the deployment.

FIG. 6C illustrates an example of how a 10 MHz carrier bandwidth can be split into two 5 MHz carrier channel in the deployment. A subchannel of 20 subcarriers is used to explain how a subchannel can be properly defined to support multi-carrier deployment.

FIGS. 7A and 7B illustrate an multi-carrier deployment example of 3×10 MHz channel bandwidth. In FIG. 7A, No guard subchannels are required to meet spectral mask requirements. In FIG. 7B, The edge subchannels are assigned as guard subchannels which are not used for transmitting signals in order to meet the spectral mask requirements. When Subcarrier spacing is 12.5 KHz, and a subchannel consists of 20 subcarriers, a subchannel bandwidth is 250 KHz, multiple subchannels (250 KHz each) can be used for guard subchannels.

While this specification contains many specifics, these should not be construed as limitations on the scope of any invention or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described, variations and enhancements of the described implementations and examples, and other implementations are possible based on what is described. Other embodiments are within the scope of the following claims.

The invention claimed is:

1. A method for allocating spectral bandwidth for an Orthogonal Frequency Division Multiplexing (OFDM), Orthogonal Frequency Division Multiple Access (OFDMA), or Single Carrier Frequency-Division Multiple Access(SC-FDMA) system, comprising
    dividing available spectral bandwidth into a channel raster and a plurality of nominal channels, each channel for carrying an independent OFDM or OFDMA or SC-FDM signal and each channel having a corresponding nominal channel bandwidth;
    choosing a common subcarrier spacing of orthogonal subcarriers that divides the multiple nominal channel bandwidths and the channel raster evenly; and
    allocating multiple carriers to be one next to another as a group in the same frequency band with reduced guard bands or without guard bands in between,
    wherein a common subcarrier spacing of orthogonal subcarriers is aligned in frequency between boundaries of adjacent carriers to reduce or eliminate inter-carrier interference;
    wherein the common subcarrier spacing can evenly divide each of multiple of different channel raster frequencies of one or more frequency bands.

2. The method of claim 1, wherein:
    the multiple carriers have the same or different nominal bandwidths.

3. The method of claim 1, wherein:
    the multiple carriers have different nominal bandwidths.

4. The method of claim 1, wherein:
the multiple carriers have different multi-carrier channel bandwidths which are supported dynamically in time, from slot to slot or symbol to symbol.

5. The method of claim 1, wherein allocating multiple different nominal carriers to be side-by-side one next to another in frequency to allow a full carrier bandwidth to be utilized without guard bands in between.

6. The method of claim 3, wherein the common subcarrier spacing is selected to evenly divide the channel raster frequency of a frequency band.

7. The method of claim 6, wherein the common subcarrier spacing is 12.5 KHz which can divide the RF channel rasters of 250 KHz and 200 Khz to provide multi-carrier mixed bandwidth deployment.

8. The method of claim 6, wherein: the common subcarrier spacing is 10 KHz which can divide the RF channel rasters of 250 KHz and 200 Khz to provide multi-carrier mixed bandwidth deployment.

9. A method for allocating spectral bandwidth for an Orthogonal Frequency Division Multiplexing (OFDM), Orthogonal Frequency Division Multiple Access (OFDMA) system, or Single Carrier Frequency-Division Multiple Access(SC-FDMA), comprising:
dividing a frequency band into a plurality of channels with nominal channel bandwidths;
dividing each channel into a plurality of subchannels each comprising a plurality of subcarriers separated by a common subcarrier spacing, wherein the common subcarrier spacing is aligned in frequency between boundaries of adjacent carriers to reduce or eliminate inter-carrier interference, and wherein the common subcarrier spacing can evenly divide each of multiple of different channel raster frequencies of one or more frequency bands; and
selecting the nominal channel bandwidths so that each nominal channel bandwidth is evenly divided into a plurality of subchannels; and
using one or more edge subchannels at a spectral end of a channel as guard subchannels without transmitting signals.

10. The method of claim 9, wherein:
each subchannel is configured to include 20 subcarriers for system deployment.

11. The method of claim 9, wherein:
each subchannel is configured to include 16 subcarriers for system deployment.

12. The method of claims 9, comprising:
providing a DC subcarrier at the center of the carrier bandwidth in a subchannel for system deployment.

13. The method of claim 9, wherein:
allocating subchannels to be side-by-side one next to another across multiple carriers without any unassigned group of subcarriers.

14. The method of claim 9, comprising:
using a common transmitter to transmit the channels.

15. The method of claim 9, comprising:
using a plurality of different transmitters to transmit the plurality of channels, respectively, wherein the transmitters are synchronized in frequency.

16. A method for spectral bandwidth allocation for an Orthogonal Frequency Division Multiplexing (OFDM), Orthogonal Frequency Division Multiple Access (OFDMA), or Single Carrier Frequency-Division Multiple Access(SC-FDMA) system, comprising:
dividing available spectral bandwidth into a channel raster and a plurality of nominal channels by allocating multiple different nominal channels to be sequentially next to one another in frequency without guard bands in between, wherein each channel carries an independent OFDM or OFDMA or SC-FDM signal;
assigning all subcarriers in the multiple different nominal channels to have a common subcarrier spacing, which evenly divides the channel raster, between two adjacent subcarriers and to be aligned across the multiple different nominal channels;
selecting a sampling frequency that is equal to or greater than a given nominal channel bandwidth or multiple nominal channel bandwidths;
using subcarriers within a given nominal channel bandwidth or multiple channel bandwidths for signal transmission without assigning subcarriers as guard subcarriers at both ends of the nominal channel bandwidth for each of the multiple different nominal channels;
wherein the common subcarrier spacing of orthogonal subcarriers is aligned in frequency between boundaries of adjacent carriers to reduce or eliminate inter-carrier interference; and
wherein the common subcarrier spacing can evenly divide each of multiple of different channel raster frequencies of one or more frequency bands.

\* \* \* \* \*